(12) United States Patent
Coffey et al.

(10) Patent No.: US 11,538,505 B1
(45) Date of Patent: Dec. 27, 2022

(54) ENCLOSURES HAVING A FRICTION STIR WELD, PRECURSORS THEREOF HAVING A METAL BASE HAVING A RECESS AND A METAL COVER, AND RELATED METHODS

(71) Applicant: Seagate Technology LLC, Cupertino, CA (US)

(72) Inventors: Jerome Thomas Coffey, Boulder, CO (US); David R. Lapp, Boulder, CO (US); Samuel Edward Severson, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 1252 days.

(21) Appl. No.: 15/990,073

(22) Filed: May 25, 2018

(51) Int. Cl.
*G11B 33/14* (2006.01)
*B23K 20/12* (2006.01)

(52) U.S. Cl.
CPC ...... *G11B 33/1446* (2013.01); *B23K 20/1225* (2013.01); *B23K 20/1255* (2013.01)

(58) Field of Classification Search
CPC ............ G11B 33/1466; G11B 33/1486; G11B 25/043; G11B 33/022; G11B 33/125; B23K 20/1225; B23K 20/1255
See application file for complete search history.

(56) References Cited

U.S. PATENT DOCUMENTS

| | | | | |
|---|---|---|---|---|
| 5,025,335 A | * | 6/1991 | Stefansky | G11B 33/1446 360/137 |
| 5,611,479 A | * | 3/1997 | Rosen | B29C 66/836 228/2.1 |
| 6,045,028 A | * | 4/2000 | Martin | B23K 20/128 228/262.5 |
| 6,704,161 B1 | * | 3/2004 | Pham | G11B 33/08 |
| 6,982,850 B1 | | 1/2006 | Ying | |
| 7,271,513 B2 | * | 9/2007 | Xu | B29C 45/14778 720/697 |
| 8,016,179 B2 | | 9/2011 | Burford | |
| 8,279,552 B2 | * | 10/2012 | Stipe | G11B 25/043 360/99.18 |
| 8,393,519 B2 | * | 3/2013 | Allehaux | B23K 20/1235 228/2.1 |
| 8,599,514 B2 | * | 12/2013 | McGuire, Jr. | G11B 33/022 360/97.15 |
| 8,603,571 B2 | * | 12/2013 | Carlson | B23K 20/1215 427/11 |
| 8,699,179 B1 | * | 4/2014 | Golgolab | G11B 33/1486 360/97.12 |
| 8,837,123 B2 | * | 9/2014 | Wang | B23K 20/12 361/679.01 |
| 9,025,284 B1 | * | 5/2015 | Sill | G11B 25/043 360/265.7 |
| 9,073,149 B2 | * | 7/2015 | Raschke | B29C 65/7835 |
| 9,190,115 B2 | * | 11/2015 | McGuire, Jr. | G11B 33/022 |
| 9,208,825 B1 | * | 12/2015 | Gustafson | G11B 33/1466 |

(Continued)

*Primary Examiner* — Brian E Miller
(74) *Attorney, Agent, or Firm* — Kagan Binder, PLLC (57) ABSTRACT

Described are enclosures that include a friction stir weld, including electronic device enclosures, and precursors thereof that contain a metal base that includes a recess and a metal cover that in an assembled condition form a joint at which a friction stir weld can be produced, as well as methods for producing a friction stir weld at a joint of such an assembly; the base includes at least one bow wave reduction feature.

9 Claims, 7 Drawing Sheets

(56) References Cited

U.S. PATENT DOCUMENTS

| | | | |
|---|---|---|---|
| 9,481,932 B2 | 11/2016 | Law | |
| 9,522,446 B2 | 12/2016 | Law et al. | |
| 9,536,572 B2 * | 1/2017 | Lapp | G11B 33/121 |
| 10,442,030 B2 * | 10/2019 | Severson | B23K 20/129 |
| 10,566,032 B2 * | 2/2020 | Coffey | G06F 1/1626 |
| 10,596,658 B1 * | 3/2020 | Coffey | C22C 38/50 |
| 11,020,816 B1 * | 6/2021 | Coffey | B23K 20/127 |
| 11,031,048 B1 * | 6/2021 | Ma | G11B 33/027 |
| 2007/0064403 A1 * | 3/2007 | Badarinarayan | B23K 20/1265 |
| | | | 361/796 |
| 2012/0275105 A1 * | 11/2012 | McGuire, Jr. | G11B 25/043 |
| | | | 29/603.03 |
| 2012/0275287 A1 * | 11/2012 | McGuire, Jr | G11B 33/1466 |
| | | | 29/603.03 |
| 2012/0298724 A1 * | 11/2012 | Kato | B23K 20/1245 |
| | | | 228/2.1 |
| 2017/0062019 A1 * | 3/2017 | Severson | G11B 33/14 |
| 2017/0101202 A1 * | 4/2017 | Fitzgerald | G11B 33/027 |
| 2017/0308114 A1 * | 10/2017 | Fitzgerald | G06F 1/16 |
| 2017/0330601 A1 * | 11/2017 | Lapp | G11B 33/1486 |
| 2019/0076956 A1 * | 3/2019 | Coffey | G06F 1/1656 |
| 2019/0076957 A1 * | 3/2019 | Severson | B23K 20/1225 |
| 2020/0038990 A1 * | 2/2020 | Coffey | H05K 5/04 |

* cited by examiner

PRIOR ART

PRIOR ART

ENCLOSURES HAVING A FRICTION STIR WELD, PRECURSORS THEREOF HAVING A METAL BASE HAVING A RECESS AND A METAL COVER, AND RELATED METHODS

FIELD

The invention relates to electronic devices that include a friction stir weld, and precursors of these devices such as assemblies in the form of electronic device enclosures that contain a base and a cover and that in an assembled condition form a joint at which a friction stir weld can be produced, as well as methods for producing such a friction stir weld at such a joint.

BACKGROUND

Electronic devices such as data storage devices (e.g., hard disk drives or "HDDs"), solid state memories, microelectronic devices, and computers (e.g., personal computers, cell phones, tablets, laptops, etc.) perform essential functions in today's digital information-intensive world. As our reliance on these devices increases, so do the performance requirements of these devices, including their combined speed and reliability.

To increase reliability of certain types of advanced electronic devices, e.g., hard disk drives, these devices can be constructed to include an enclosure that is tightly sealed to contain the contents in a desired atmosphere that contains a very low level of undesired contaminants such as airborne particulates, vapors, humidity (water vapor), etc.

In certain types of enclosures, e.g., for a hard disk drive enclosure, an enclosure may be sealed hermetically to contain a non-air atmosphere, for example a low density atmosphere such as a concentrated helium atmosphere. Benefits of operating a hard disk drive in a low density atmosphere include that the low density atmosphere can reduce the amount of drag force that affects a spinning disk or a stack of closely-spaced spinning disks. The reduced amount of drag can significantly reduce the amount of power required to cause a disk stack to spin. Also, a low density atmosphere can reduce the amount of unwanted, non-rotational movement or "flutter" that occurs in a spinning disk, or undesired movement of a suspension assembly that works in conjunction with the spinning disk. Reducing un-wanted motion of a disk or suspension assembly can allow adjacent disks of a disk stack to be placed more closely together, which increases areal density (a measure of the quantity of information bits that can be stored on a given area of disk surface) by enabling a narrower data track pitch. Also advantageously, efficient thermal conduction of helium can allow for a reduced operating temperature of a device, and lower density gases (relative to air) can additionally produce less acoustic noise. The reliability of a hard disk drive that contains an atmosphere of concentrated helium in a hermetically sealed enclosure can also be increased due to a reduced level of humidity at the drive interior, due to elimination of other gases and contaminants such as reactive (e.g., corrosive) gases, and due to a reduced sensitivity of the atmosphere to altitude and external pressure variations.

An electronic device that is designed to be hermetically sealed must include an enclosure that can be assembled and hermetically sealed in a manner that effectively, efficiently, and reliably produces a long-lasting, high quality hermetic seal.

SUMMARY

Friction stir welding is a technique that is known to be useful in various industrial welding applications. See for example U.S. Pat. Nos. 8,016,179 and 9,536,572, the entireties of these documents being incorporated herein by reference. Friction stir welding techniques, however, are known to have limits, and are understood to be not necessarily effective or efficient for all situations where a weld between two metal components is required. Friction stir welding techniques can be most effectively and reliably used for welding together two metal pieces that each do not have too small of a thickness, for example two metal pieces that each have not too small of a thickness and that each have thicknesses that are somewhat similar. Friction stir welding techniques are not generally known to be reliably or successfully used for welding together two metal pieces that are relatively thin, or to weld together a first metal piece having a relatively small thickness with a second metal piece having a relatively larger thickness.

Applicant's research in the area of friction stir welding techniques has identified new and advantageous methods and devices that can be used to successfully weld, by friction stir welding methods, a metal base and a thin-gauge metal cover of an electronic enclosure such as an enclosure of a hard disk drive. Applicant's research, for example, has led to designs of useful and advantageous friction stir weld tools, useful and advantageous welding conditions and parameters, and useful and advantageous cover and base configurations. As improvements to past friction stir weld techniques, recent developments by Applicant have now led to friction stir welding techniques and systems that can be used to reliably form high quality friction stir welds on materials that include a relatively thin gauge metal, such as a thin gauge metal sheet used as a cover of an electronic device enclosure, e.g., a hard disk drive. Typical covers for electronic device enclosures are made of aluminum or an aluminum alloy, and may have a thickness that is less than 100 mils, e.g., less than 50 mils.

At a commercial scale, a friction stir welding technique should be able to efficiently and reliably produce a commercial volume of high quality friction stir welds. While Applicant has now identified various methods to allow for friction stir welding of thin gauge metal, e.g., less than 100 mil or less than 50 mil thickness metal, efficient or optimized uses of the methods has been found to sometimes cause a "bow wave" to form in the thin gauge metal material during friction stir welding.

A "bow wave," generally, is a wave that is produced by a ship traveling through water. The bow wave occurs ahead of the ship as the ship pushes through the water. A bow wave produced in a thin gauge metal sheet during friction stir welding, e.g., in a lip of a metal cover, is analogous to a bow wave produced by a ship. In the context of a base and cover assembly, a bow wave is a curved displacement of an edge of a lower lip of the cover away from the base, with the base and cover in an assembled condition, during performance of a friction stir weld step at a joint between the cover and the base. The bow wave becomes located at a position in front of the friction stir weld tool as the tool advances along a length of the joint. The curved displacement is a positioning of the edge of the lower lip of the cover in a direction away from the base, i.e., to produce a curved "bow" shape in the longitudinal edge of the cover where the edge of the cover normally contacts the sidewall surface of the base. During friction stir welding, a rotating friction stir weld tool is contacted against the joint, including contact with pressure against the cover lip end portion. The pressure placed on the lip end portion by the friction stir weld tool, with the movement of the friction stir weld tool along a length of the lower lip of the cover, can produce the "bow wave."

This bow wave includes a small "extra" length of the cover material relative to the length of a perimeter of the base that remains for forming a friction stir weld around a complete perimeter of a base and cover. This produces a gap between the cover and the base. The friction stir weld has a start and finish on a closed path around the drive. If a large enough gap is created or if too much extra cover material is pushed around the cover from the start to the finish of the weld, the friction stir weld may not make a good seal, or may wrinkle or fold at the end of the friction stir weld step.

A bow wave reduction feature introduced into the base can eliminate the bow wave and provide for a good friction stir weld joint. In brief, and without being bound by any particular theory or mechanism of action, a bow wave reduction feature may be effective to reduce or eliminate a bow wave because the reduction feature creates a longer weld path on the base to absorb the excess cover material that is causing the bow wave, or otherwise creates an extra amount of space (in a vertical (height) or in a horizontal (depth)) dimension for the extra material of the bow wave to reside, during and after formation of the friction stir weld.

The bow wave reduction feature can have any shape, size, or geometry, as long as the reduction feature is effective to remove or prevent a bow wave, for example by increasing a length of the weld path. A perimeter of a base may include only one bow wave reduction feature, or two or more bow wave reduction features may be present along the perimeter.

In one aspect, the invention relates to an enclosure that includes a metal base and a metal cover. The metal base includes: a horizontal bottom, a base cavity defined by the bottom and vertical base sidewalls at a base perimeter, and an outer sidewall surface extending along the base perimeter. The base, as part of the outer sidewall surface, additionally includes a shoulder that includes: a horizontal shoulder surface, an upper sidewall surface extending vertically upward from the horizontal shoulder surface, and a lower sidewall surface extending vertically downward from the horizontal shoulder surface. The base includes at least one bow wave reduction feature in the form of a recess present in the horizontal shoulder surface, the upper sidewall surface, and the lower sidewall surface, and extending along a portion (length) of the outer sidewall surface. The metal cover can be located over the base.

In another aspect, the invention relates to a method of forming a friction stir weld on an enclosure. The enclosure includes a metal base and a cover. The metal base includes: a horizontal bottom and a base cavity defined by the bottom and vertical base sidewalls at a base perimeter and an outer sidewall surface extending along the base perimeter. The outer sidewall surface includes a shoulder having: a horizontal shoulder surface; an upper sidewall surface extending vertically upward from the horizontal shoulder surface; and a lower sidewall surface extending vertically downward from the horizontal shoulder surface. At least one recess is present in the horizontal shoulder surface, the upper sidewall surface, and the lower sidewall surface, extending along a portion of the outer sidewall surface. The metal cover is located over the base. The cover includes a horizontal top portion extending over the base and a lip at a cover perimeter. The lip extends in a vertical direction relative to the horizontal top portion. The lip includes a lower lip portion that forms a joint with the shoulder when the cover is installed over the base. The method includes contacting the joint with a rotating friction stir weld tool to form the friction stir weld.

BRIEF DESCRIPTION OF THE DRAWINGS

All drawings are schematic and not to scale.

DETAILED DESCRIPTION

The invention relates to assemblies that include two metal components of an enclosure that is useful for enclosing an electronic device. The invention also relates to electronic devices that include the enclosure, as well as related methods. The invention additionally relates to a base component of the assembly either individually or in combination with the cover; methods of assembling the two metal components to form an assembly in the form of an enclosure with a joint that may be in an un-welded state or in a welded state; methods of forming a friction stir weld at a joint of an assembly as described; and a welded (post-welded) assembly.

The two metal components can be referred to herein as a base and a cover. The cover includes a horizontal (flat, planar) top portion and a vertical (meaning at least approximately or substantially vertical) lip that extends from the perimeter of the horizontal portion in a vertical (downward) direction relative to the horizontal top portion. The base and the cover can be placed adjacent to each other (in an opposed arrangement) in an assembled condition that includes the base and the cover contacting each other at each of their respective perimeters along an unwelded joint (in an unwelded condition), or along a welded joint (in a welded condition), to form an enclosure having an interior. Example covers can be placed over a base with an inner vertical surface of the lip of the cover contacting an outer vertical surface of the sidewall of the base to form a joint between the perimeter of the base sidewall and the perimeter of the lip of the cover. Along the length of the joint, a friction stir weld can be produced to secure the cover to the base and to form a hermetic seal around the perimeter of the completed assembly.

The described friction stir welding techniques and related assemblies include a feature of the base that prevents or eliminates the presence of a bow wave that can form ahead of a friction stir weld tool during formation of a friction stir weld. During friction stir welding of a cover to a base, a bow wave may form along a portion of the cover that is ahead of (in "front" of) a forward-moving friction stir weld tool. A bow wave is a curved displacement of an edge of a lower lip of the cover that is generated ahead of or in front of the friction stir weld tool as the tool advances along a length of a joint at which a friction stir weld is being formed. The curved displacement is a positioning of the material of the edge of the lower lip of the cover in a direction away from the base, i.e., to produce a curved "bow" shape in the longitudinal edge of the lower lip of the cover, where the edge of the lower lip should normally contact the sidewall surface of the base near or at the shoulder of the base.

During friction stir welding of a cover to a base, a rotating face of the friction stir weld tool is held with substantial pressure, and with movement in a lengthwise (forward) direction, against a joint formed between a lower lip portion of the cover and a sidewall of the base. The pressure placed on the lower lip portion by the friction stir weld tool, and the movement of the friction stir weld tool along the length of the lower lip portion of the cover, can produce a "bow wave" in front of the friction stir weld tool as the weld is formed by the rotating tool. The bow-shaped displacement of material of the lip portion of the cover produces a curved gap between the outer surface of the sidewall and the displaced curved edge of the lip portion. See FIG. 5C. The bow wave can include a displacement of the lower lip of the cover away from the sidewall of the base by a very small distance, e.g., up to about 0.4 millimeters at a maximum distance between the edge of the lower lip (at a crest of the bow wave) and the base sidewall.

The bow wave is propagated in the forward direction of movement of the friction stir weld tool as the tool moves along the joint to form the friction stir weld. The bow wave can propagate and increase in size as the friction stir weld tool advances along the joint and around the perimeter of the cover and base, during formation of the friction stir weld. At an end of a friction stir weld step, i.e., when the friction stir weld tool has passed almost entirely around the perimeter of the base and cover assembly and the friction stir weld tool is approaching the starting location of the weld, the bow wave includes an amount of material of the lip portion of the cover that has a length that is greater than a remaining non-welded length of the base; i.e., when approaching an end of a weld, a length of unwelded material of the lower lip of the cover (which contains the bow wave) is longer than a length of unwelded material of the surface of the base. A maximum amount of the displacement occurs at the end of the friction stir weld, and, if the bow wave becomes large enough, the bow wave can produce a wrinkle or other defect in the friction stir weld.

The bow wave reduction feature can be a recess (also referred to as a "gap") that is present in material of the base along a length of the base sidewall, at or adjacent to the horizontal shoulder surface. The recess (e.g., "gap" in material) can be at a location of a horizontal shoulder surface of the sidewall that forms part of the joint with the lip portion of the cover. The recess can also be present below the horizontal shoulder surface and above the horizontal shoulder surface.

According to the invention, a bow wave reduction feature is included in a base of a base and cover assembly. The bow wave reduction feature is a structure at a surface of the base sidewall, i.e., a surface configuration, that will be effective to prevent formation of a bow wave, or to eliminate or to reduce a size of a bow wave that forms during a friction stir weld step as the friction stir weld tool passes over the bow wave reduction feature during formation of a friction stir weld. Without wishing to be bound by theory, the recess in the base can be effective as a bow wave reduction feature because the recess provides additional length in a weld path to accommodate the excess amount of material of the lower lip that causes the bow wave. The recess provides an opening in a horizontal (e.g., depth) direction, in a vertical (height) direction, or both, that is available for the excess material of the lip that causes the bow wave to be placed during formation of the friction stir weld.

Figure 1:
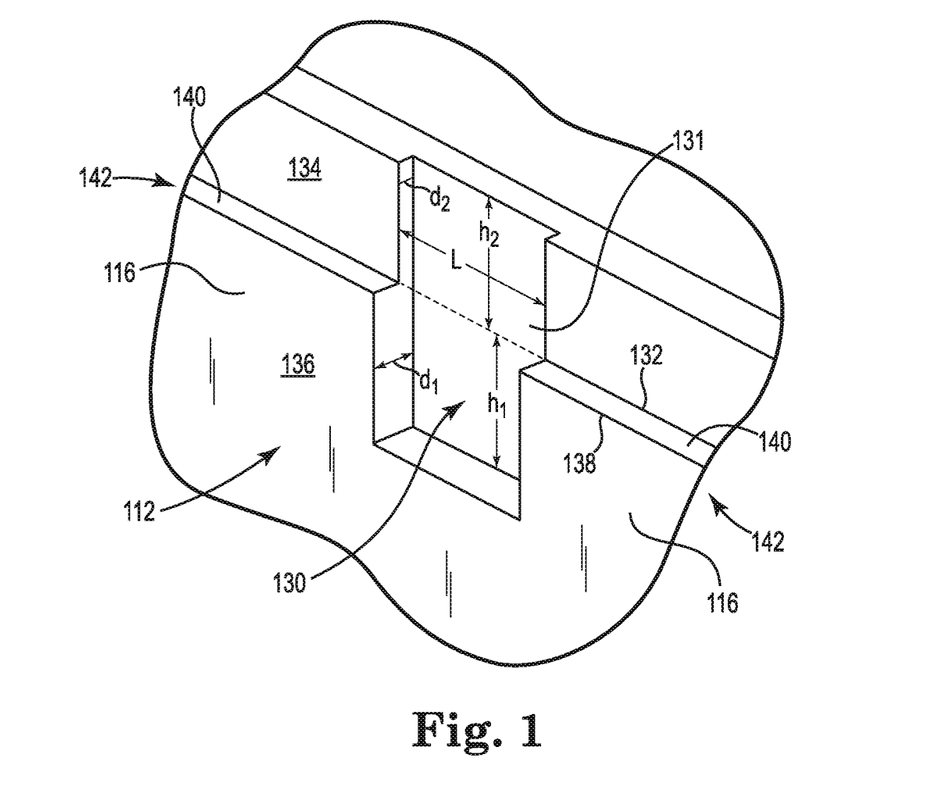
FIG. 1 illustrates an example of a base of a described assembly that includes a bow wave reduction feature.

An example of a bow wave reduction feature is shown at FIG. 1. Base 112 is illustrated to include vertically-extending sidewall 116, which includes shoulder 142. Shoulder 142 is defined by structures that include horizontally-extending shoulder surface ("horizontal shoulder surface") 140, upper sidewall 134, and lower sidewall 136. Horizontal shoulder surface 140 extends horizontally as part of sidewall 116 at a location that is vertically between a top and the bottom of the sidewall, and extends longitudinally along the length of the sidewall and around the entire perimeter of the sidewall. Horizontal shoulder surface 140 meets vertically-extending lower sidewall surface ("lower sidewall") 136 at exterior shoulder corner 138. Horizontal shoulder surface 140 meets vertically-extending upper sidewall surface ("upper sidewall") 134 at interior shoulder corner 132. This combination of surfaces and corners extends semi-continuously about a perimeter of base 112, and is interrupted by one or more recesses 130, having back recess surface 131. As illustrated at FIG. 1, recess 130 extends vertically in directions both above and below horizontal shoulder surface 140.

Recess 130 has a length L that is effective (in combination with a depth, positioning, and other shape characteristics of recess 130) for recess 130 to function as a bow wave reduction feature. A necessary or useful length can depend on factors such as the total number and the placement of bow wave reduction features around a perimeter of a base, the depth of the recess, location of the recess (both above and below the horizontal shoulder surface), as well as the nature (size) of a bow wave being formed during a particular friction stir welding step, and size features of a friction stir weld tool used to form the friction stir weld. An example of a useful length can be stated in terms of the diameter of a distal face of a friction stir weld tool that contacts the joint; example lengths can be at least 2 times the diameter of the distal face of the friction stir weld tool, e.g., from 2 to 6, e.g., from 2 to 4 times the diameter of the friction stir weld tool. In terms of specific lengths, non-limiting examples may be in a range from 4 to 30 millimeters, e.g., from 5 to 20, or from 7 to 15 millimeters.

Recess 130 has a depth d that is effective (in combination with other shape and size features of the recess) for recess 130 to function as a bow wave reduction feature. This depth is measured relative to the outer surface of sidewall 16, e.g., the outer surface of upper sidewall 134, and the outer surface of lower sidewall 136. Consequently, the depth (d2) will be relatively shallower at the upper portion of recess 130 located above horizontal shoulder surface 140, and will be relatively deeper (d1) at a lower portion of recess 130 located below horizontal shoulder surface 140. A depth of recess 130 can be selected based on factors such as the total number and the placement of bow wave reduction features around a perimeter of a base, as wells as the nature (size) of a bow wave being formed during a particular friction stir welding step, and size features of a friction stir weld tool used to form the friction stir weld. Examples of a useful depth d2 of recess 130 above horizontal shoulder surface 140 may be in a range from 0.1 to 1 millimeters, e.g., from 0.2 to 1 millimeter. Examples of a useful depth d1 of recess 130 below horizontal shoulder surface 140 may be in a range from 0.2 to 2 millimeters, e.g., from 0.4 to 1.5 millimeter.

Recess 130 also has a vertical height, h, that is effective for recess 130 to function as a bow wave reduction feature. The height is preferably sufficiently large above and below the location of horizontal shoulder surface 140 to match or exceed the size (distal face diameter) of a friction stir weld tool used to form a friction stir weld at the location of the recess. An example of a useful height (h1, extending vertically downward from horizontal shoulder surface 140) can be at least 0.5 times the diameter of the distal face of the friction stir weld tool, e.g., from 0.6 to 3 times the diameter of the friction stir weld tool, or from 1 to at least 2 times the diameter of the friction stir weld tool. In terms of specific lengths, non-limiting examples may be in a range from 1 to 20, e.g., from 2 to 10 millimeters. A height h2 of recess 130 above horizontal shoulder surface 140 may be in a range that is the same as example heights h1 described for example values of a height of recess 130 extending vertically below horizontal shoulder surface 140.

One or more recesses 130 may be placed at useful locations around a perimeter of a base. The locations of the one or more recesses 130 should be effective to prevent a bow wave from causing a defect, e.g., a fold or a wrinkle, in a friction stir weld. In example embodiments, a single recess can be placed on one side of an assembly as described. The location of the recess can be at an end location of a step of forming a friction stir weld, meaning that an end point (and the start point) of the friction stir weld is at or near (e.g., within 50 millimeters of) the end of the length of the recess 130, i.e., the recess is at a location that causes the friction stir weld tool to pass over the recess at an end of a step of forming a friction stir weld around an entire perimeter of an assembly.

As contemplated by the Applicant, and as presented herein, the assembly may be in an assembled and pre-welded form, or in a posted-welded form. Specifically, an assembly may include the base and the cover assembled as an enclosure that includes a joint at a perimeter of the enclosure, wherein the base and cover are held together (removably) at the joint by contact and friction in the absence of (i.e., prior to forming) a friction stir weld. In an alternate form, the assembly may be a welded or "post-welded" assembly of the base and cover after a friction stir weld has been formed at the joint.

An example assembly can be a hermetically-sealed enclosure of an electronic device, e.g., a hermetically-sealed hard disk drive as primarily described herein, or a precursor thereof. Desirably as a feature of a useful or preferred enclosure or electronic device, an interior of an enclosure can include a low density atmosphere. During preparation of an assembly, an interior of the assembly can be filled with an atmosphere of low density gas to displace air within the interior and to provide a low density (relative to air) atmosphere at the interior of the enclosure. An atmosphere of concentrated helium (e.g., at least 80, 90, 95, or at least 99 percent helium), for example, is one useful type of low density atmosphere. With the un-welded assembly containing the low density atmosphere, the assembly can be processed by forming a friction stir weld along an entire length of a joint formed between the cover and the base, meaning around the entire perimeter of the assembly. The friction stir weld can be effective to hermetically seal the enclosure and contain the low density gas inside of the enclosure while preventing other gases at an exterior of the enclosure from entering the enclosure. Example hermetically sealed enclosures that include the friction stir weld can allow for not more than a very low rate of leakage from the enclosure, for example a rate of leakage that is less than 1 percent of a volume of atmosphere (gas) present within the enclosure per year. Examples of hard disk drives that include a base and a cover and that are hermetically sealed to contain a low density atmosphere are described in U.S. Pat. No. 9,536,572, the entirety of which is incorporated herein by reference. See also U.S. Pat. No. 8,279,552, describing a hermetically sealed hard disk.

A base of an enclosure generally includes an interior space or cavity defined by a horizontal (flat, planar) bottom that includes a perimeter, and by vertically-extending sidewalls that extend from the base, around the entire perimeter of the base, in a vertical direction relative to the horizontal bottom. Located over the base cavity, yet still within the enclosure, may optionally be a second "inner" cover along with an inner cover gasket, to provide an interior closure and seal of the base cavity. An inner cover can extend over the base cavity and contact the top surface of the sidewall of the base, at the top sidewall perimeter of the base, to cover and enclose the base cavity.

The base may be constructed of any useful metal material and may have any general or specific form consistent with the present description. Example base structures may be made of a metal alloy such as an aluminum alloy, for example a 4000 series or 6000 series aluminum alloy. The base structure can be of any useful form, such as being composed of a single integral piece or two or more pieces that are secured (e.g., welded) together. The process for preparing the base may be any, as desired, such as by being forged, extruded, cast, machined, stamped, etc. The material of the base may be aluminum or an aluminum alloy, but other metals and metal alloys may also be useful.

The base sidewall extends continuously about the entire perimeter of the base and includes a vertically-extending upper sidewall surface ("upper sidewall"), a vertically-extending lower sidewall surface ("lower sidewall"), a sidewall top, and a horizontally-extending shoulder surface ("horizontal shoulder surface") that extends horizontally as part of the sidewall at a location that is vertically between the top and the bottom of the sidewall, along the height of the sidewall. The horizontal shoulder surface extends horizontally as part of the outer sidewall surface, and extends continuously around the entire perimeter of the base. The horizontal shoulder surface connects at an inner edge to a lower portion (or lower edge) of the upper sidewall, at an interior shoulder corner; the horizontal shoulder surface connects at an outer edge to an upper portion (or upper edge) of the lower sidewall, at an exterior shoulder corner.

With the cover and the base in an assembled condition, the lower portion (or "lower end") of the lip of the cover is seated against, e.g., engages or contacts, the lower portion of the upper sidewall, the horizontal shoulder surface, or both. At that engagement, the lower end of the lip forms a joint with the shoulder of the base; the engagement (or "joint") extends continuously around the assembly at the perimeter of the assembly. As described herein, a friction-stir weld can be formed at the joint, around the entire perimeter of the assembly, to produce a hermetic seal that extends entirely around the perimeter of the base and the cover.

The sidewall has a thickness that extends horizontally from an outer sidewall surface to an inner sidewall surface that defines the base cavity. The thickness of the sidewall can vary along the height of the sidewall, such as by being thicker (having a greater thickness) at a lower portion of the sidewall, and being less thick (having a smaller thickness) at an upper portion of the sidewall. The sidewall top is the uppermost surface of the sidewall, which may typically include a horizontal orientation and have a thickness in a horizontal direction. A thickness at the top and bottom of the sidewall can preferably be at least about 1 millimeter, e.g., at least 2 millimeters. A presently-useful example of a sidewall can have a thickness at a location of formation of a friction stir weld that may be equal to or greater than a thickness at the top of the sidewall, i.e., a greater thickness at a location of the joint, which is the location at which a friction stir weld will be formed. An example of a thickness of the sidewall at a location of a friction stir weld can be at least 1 millimeter, e.g., in a range from 2 or 3 to 5 or 7 millimeters (measured, for example, just above the horizontally-extending shoulder surface). An example of a thickness of the sidewall at a lower (e.g., bottom) location of the sidewall can be at least 2 millimeters, e.g., in a range from 3 or 4 up to about 5, 7, or 8 millimeters (measured, for example, just above the bottom of the base cavity, where the sidewall meets the bottom of the base cavity).

The cover may be constructed of any useful metal material, and may have any general or specific form that is consistent with the present description. Example cover structures may be made of aluminum or an aluminum alloy, but other metals and metal alloys may also be useful. The process for preparing the cover may be any, as desired, such as by being forged, extruded, cast, machined, stamped, etc. One particular example of a useful cover can be made of aluminum alloy, for example a 5000 series or 6000 series aluminum alloy, and may be prepared by stamping and by a non-hem (or "zero-hem") method of trimming the lower end of the lip. A zero-hem edge may be formed by known methods and equipment, such as with a cammed cut-off die. Other edge treatments that may or may not produce a zero-hem edge may also be useful.

A thickness of a cover as described, i.e., a thickness in a z-dimension (in a height direction) of the top portion of a cover, alternately a thickness in an x- or y-dimension measured at the vertically-extending lip, may be within a useful range that is sufficiently thick to allow for desired friction stir welding of the cover to the base, without being unnecessarily thick. A preferred cover material may be relatively thin, because a thinner cover material can allow for a larger interior space within an enclosure formed from the cover, meaning a larger space for interior items such as magnetic recording disks. However, a thinner cover material may be more difficult to process by friction stir welding compared to a relatively thicker cover material, because relatively thinner materials are more prone to buckling and tearing. Thus, Applicant has determined that a thickness of a cover can be sufficiently large to allow for friction stir welding as described herein, but held to a low or minimum thickness to allow for a greater amount of interior space of an enclosure that includes the cover. A range of thicknesses that can be useful or preferred is in a range from 10 mils to 50 mils, e.g., from 10 mils to 40 mils. Preferably, the entire cover, including the vertically-extending lip along the perimeter of the cover, as well as the flat upper portion, has a thickness that is relatively uniform and in a range from 10 mils thick to 40 mils thick. In preferred examples of assemblies as described, a thickness of a horizontal shoulder surface that engages a lip end portion at a joint can also be within this range and can be approximately equal to the thickness of the lip at the lip end portion.

Figure 2A:
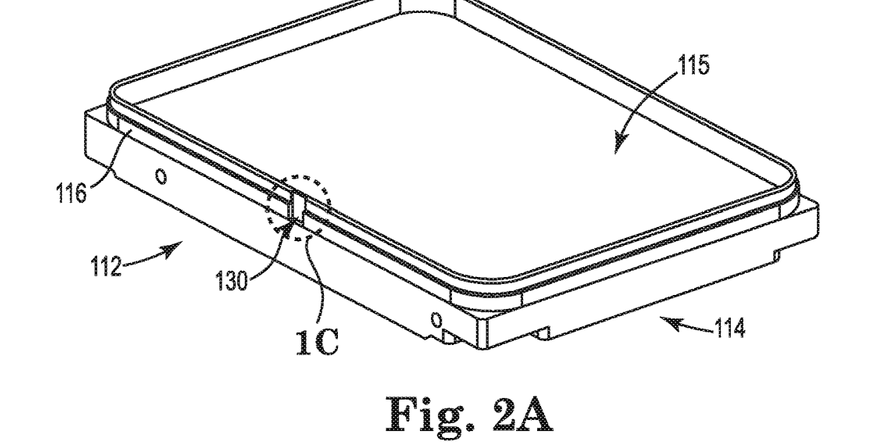
FIG. 2A shows a top perspective view of a base as described, including an example bow wave reduction feature.

Various figures provided herein show examples of covers 120, bases 112, and assemblies 90. Referring to FIG. 2A, example base 112 includes a horizontally-extending bottom 114 having a perimeter from which sidewalls 116 extend in an upward (vertical) direction (i.e., at least substantially or approximately vertical with reference to horizontally-extending bottom 114). Base cavity 115 is defined by bottom 114 and sidewalls 116. As illustrated, recess 130 is present on a sidewall at one side of rectangular base 112. See FIG. 2C. Within base cavity 115 can be located multiple stacked magnetic recording disks (not shown) as well as appurtenant electronics, read-write heads, etc., of an operational hard disk drive.

Figure 2B:
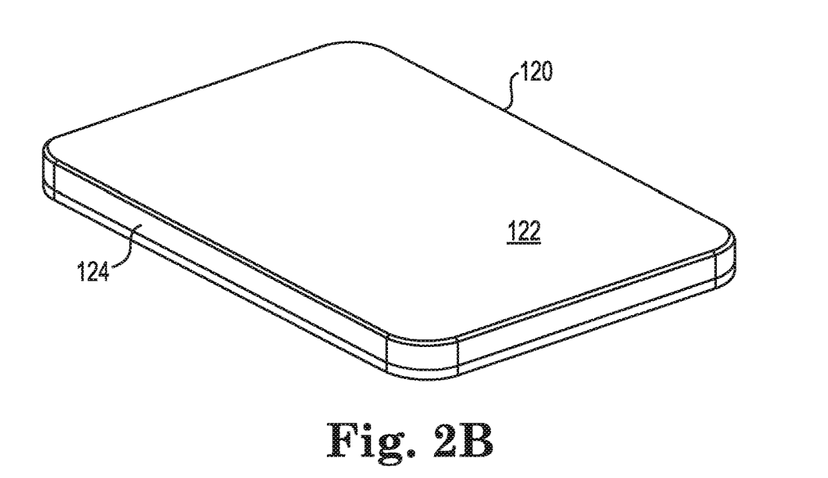
FIG. 2B shows a top perspective of a cover as described.
Figure 2C:
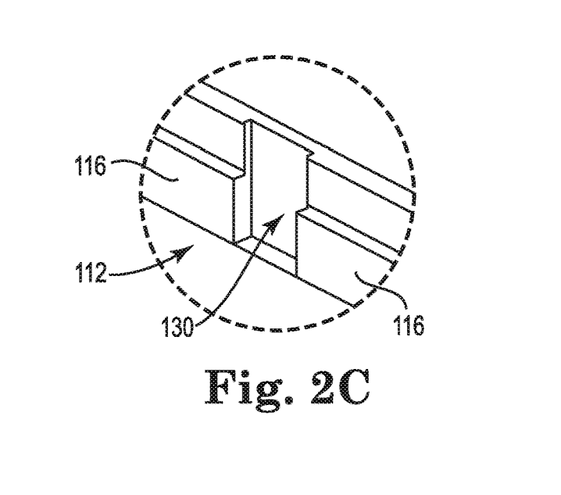
FIG. 2C shows an enlarged view of the example bow reduction feature of FIG. 2A.

Referring to FIG. 2B, example cover 120 includes horizontally-extending top portion 122 having a perimeter from which cover lip 124 extends in a downward vertical direction (i.e., at least substantially or approximately vertical with reference to horizontally extending top portion 122).

Figure 3A:
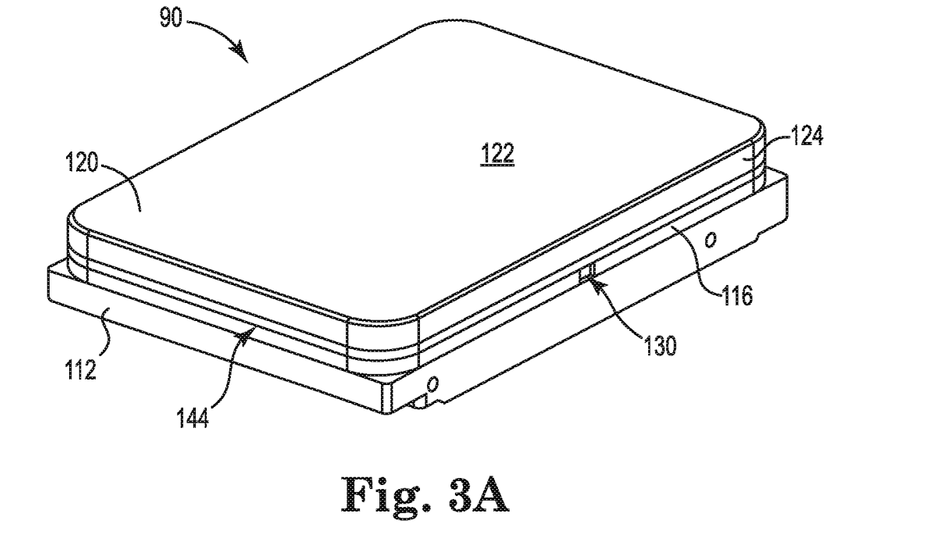
FIGS. 3A and 3B show an example assembly as described.
Figure 3B:
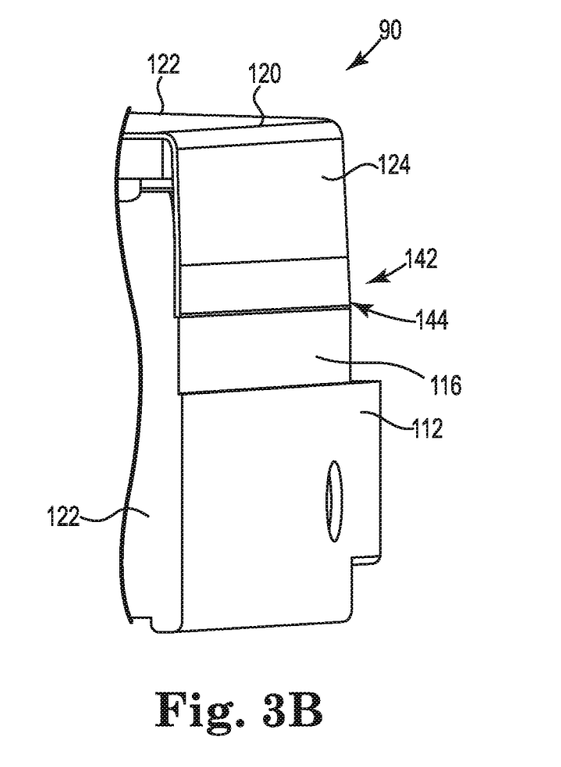

Referring to FIGS. 3A and 3B, assembly 90 is made by placing cover 122 over base 112 to form joint 144 around a perimeter of assembly 90, at which a friction stir weld can be formed. FIG. 3B shows a cut-away view of joint 144 with cover lip 124 contacting shoulder 142 of base 112 to form joint 144.

A joint (e.g., 144) as described can be processed by a step of friction stir welding the joint to produce a weld along the length of the joint, e.g., around the entire perimeter of the cover at the joint, preferably to produce a hermetic seal. Friction stir welding of a base and a cover at a joint formed between the two can be performed by rotating a friction stir weld tool and contacting the rotating tool to the joint, with pressure. The rotating tool generates heat at the joint to soften and cause flow of the metal material of the lip end, and the metal of the base, at the shoulder (and the joint). Specifically, the rotating tool heats and mechanically mixes and joins the metal materials of the base and the lip, at the joint, using mechanical pressure to soften portions of the metal materials of the lip and of the base in contact with and adjacent to the tool, and blends the portions of material from the lip and the base. The softened and mixed metal materials subsequently cool to form the finished weld. In preferred examples, a depth of the friction stir weld is at least as deep as the thickness of the lip end, preferably at least 5 or 10 percent greater than the thickness of the lip end.

Figure 4:
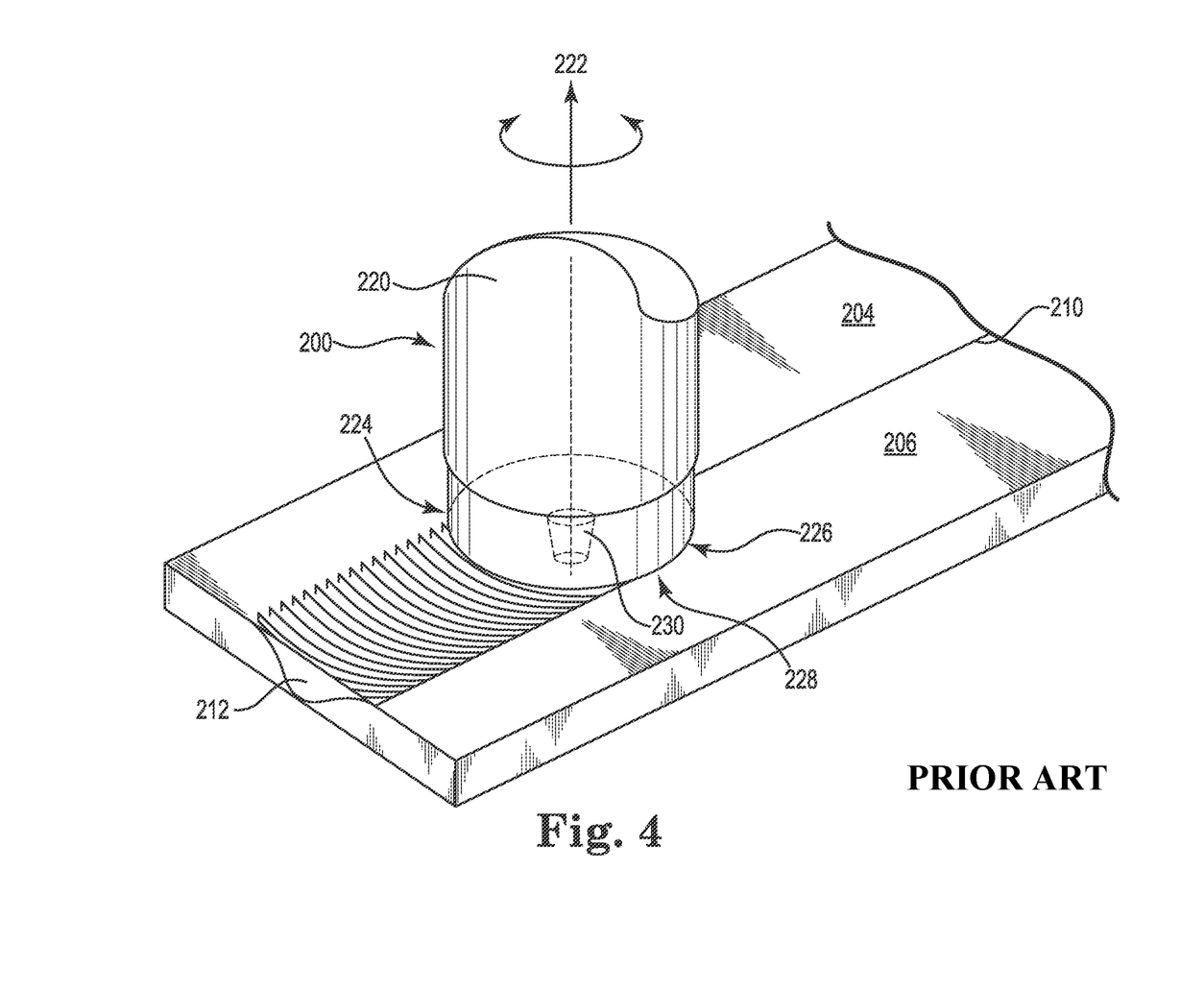
FIG. 4 shows an example friction stir weld step as described.

Referring now to FIG. 4, a method of friction stir welding a joint as described can be performed by providing tool 200 for forming a friction stir weld and rotating the tool, while applying pressure at joint 210, to form a friction stir weld 212. A first metal component 204, e.g., a base, and a second metal component 206, e.g., a cover, meet at adjacent edges to form joint 210, e.g., as described herein. Tool 200 includes support body 220 having longitudinal axis 222 and distal end 224. Distal end 224 includes distal face 228 (held against a top surface of joint 210) adapted to contact surfaces of components 204 and 206 at joint 210 during friction stir welding. Distal face 228 is centered on axis 222 and extends laterally to a perimeter of support body 220 centered on axis 222. Extending in a distal direction from distal face 228, along axis 222, is pin 230, which extends into first and second metal components 204 and 206 at joint 210 during friction stir welding.

During formation of a friction stir weld (212) along a length of a joint 210, distal face 228 of tool 200 is placed in contact with surfaces of components 204 and 206 at joint 210. Pressure from tool 200 is applied to joint 210 as tool 200 is rotated to soften (without melting) materials of metal components 204 and 206. As tool 200 moves along joint 210, friction stir weld 212 is formed. The tool (i.e., along axis 222) may be held at an angle relative to surfaces of pieces 204 and 206, and not precisely perpendicular to the surfaces. The angle may produce a tilt in a direction that aligns with the direction of motion of the tool, with the upper portion of the tool being tilted backward and the distal face being tilted to face forward. The size of the angle may be relatively small, e.g., not more than 10 degrees from perpendicular.

Figure 5A:
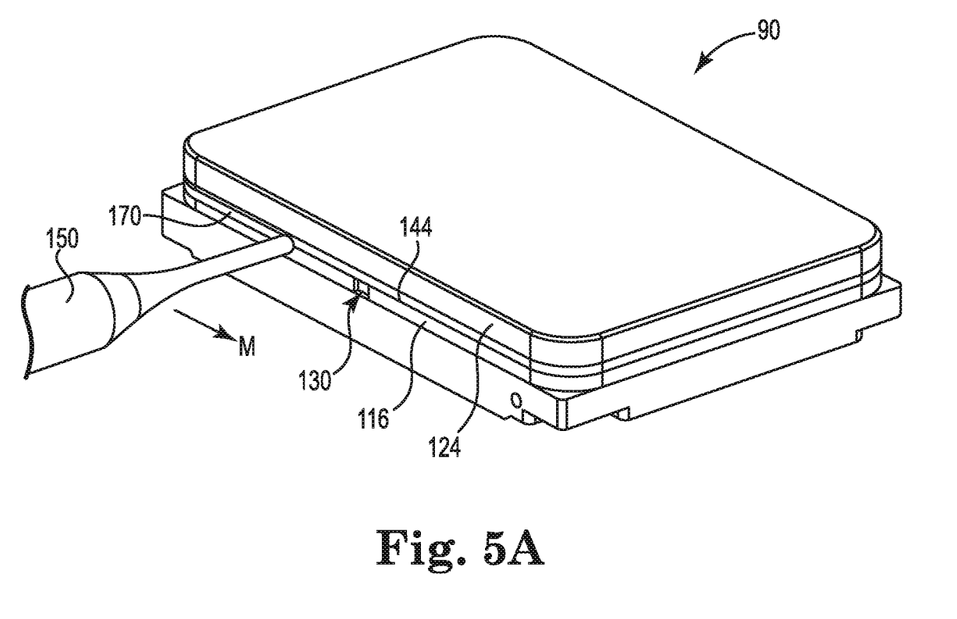
FIGS. 5A, 5B, and 5C show examples of a friction stir weld step on a workpiece that includes a bow wave reduction feature.
Figure 5B:
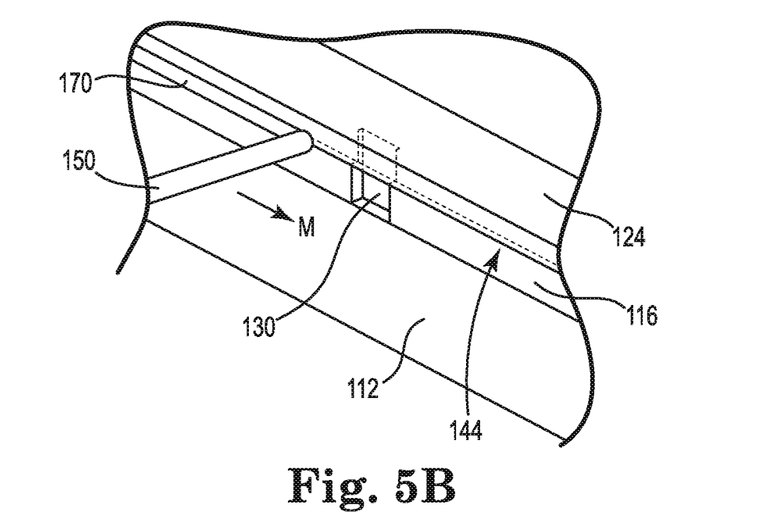
Figure 5C:
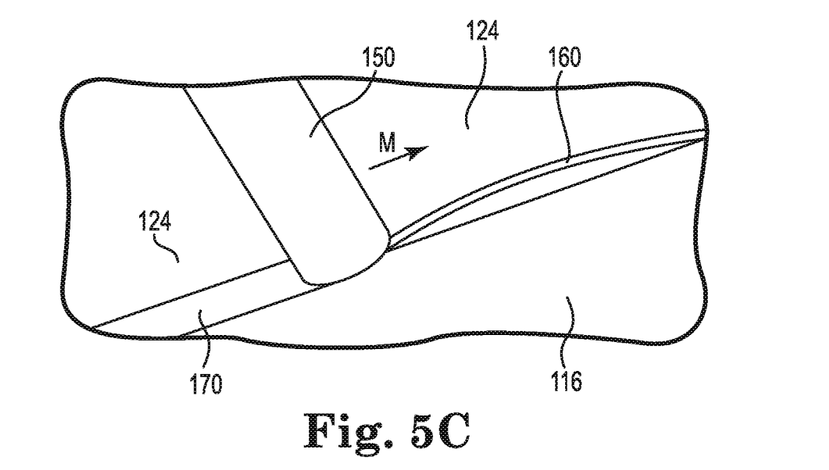

As illustrated at FIGS. 5A and 5B, a friction stir weld can be formed at joint 144 in assembly 90 that includes recess 130, acting as a bow wave reduction feature. Friction stir weld tool 150 includes a distal face that contacts joint 144. While friction stir weld tool 150 is rotated about its axis, the distal face is held in contact with joint 144, with pressure, and is moved along a length of joint 144, in direction M, to form friction stir weld 170 along joint 144.

In the described and illustrated friction stir welding step, a bow wave 160 may form in front of tool 150. See FIG. 5C, which is an enlarged view of FIG. 5A. When tool 150 reaches recess 130 with a bow wave present in front of tool 150, the bow wave can be eliminated, i.e., is removed from lower lip 124, as friction stir weld tool 150 passes over the length of recess 130. The Applicant has discovered that the recess is effective to eliminate a bow wave, and is not otherwise disruptive or interruptive of a step of forming a friction stir weld along a joint 144 that includes the recess; the friction stir weld that is formed across the length and at edges of recess 130 can be of a high quality.

Parameters of a useful step of forming a friction stir weld can be any that are useful to produce a desired friction stir weld. Examples of parameters that can be selected and controlled include rotation speed of the tool, downforce of the tool against the workpiece, speed of the tool along the length of the joint (i.e., speed of forming the weld in a length-wise direction, also referred to as translational speed), an angle of the tool relative to the workpiece (e.g., from 1 to 10 degrees), as well as dimensions of the tool itself such as the diameter of the tool at the distal face and the diameter and the length of the pin (pin length being measured along the axis of the tool from the distal face).

A depth of a friction stir weld will typically be slightly greater than a length of a pin extending from the distal face of a tool used to form the weld. A desired depth of a weld as described herein is at least as deep as, preferably deeper than, the thickness of the lip end and the width of the horizontal shoulder surface at a joint at which the weld is formed (see, e.g., FIG. 4 and related text). To form a weld of this depth, the length of the pin should be at least as long as the thickness of the lip (at the joint) and at least as long as the width of the horizontal shoulder surface of the joint, e.g., at least 5, 10, 20, or 30 percent greater than one or both of those dimensions.

During formation of the weld, the tool can be rotated at a speed that is useful to add sufficient energy to the two metal components of a joint to soften the metal components and allow mixing of the metal components by the tool. Useful and preferred rotational speeds of a tool to form a friction stir weld as described can be at least 1,000 revolutions per minute (rpm), e.g., at least 2,000 rpm, or at least 6,000, 8,000, or 12,000 rpm, and up to about 30,000 rpm.

During formation of the weld, the tool, i.e., at the distal face, can apply a downforce to the two metal components at the joint in a direction along the axis of the tool. Any amount of downforce can be used that will be effective in forming a desired weld in an efficient manner. Examples of a useful downforce may be less than about 1,000 newtons, e.g., less than 500 newtons.

During formation of the weld a tool may be moved along a joint in a lengthwise direction at any useful speed, preferably a speed that will efficiently form a high quality weld. Examples of useful speeds of a tool along a joint during formation of a friction stir weld can be in a range from about 0.1 to 3 meters per minute (e.g., from about 1.6 to 50 millimeters per second).

Figure 6:
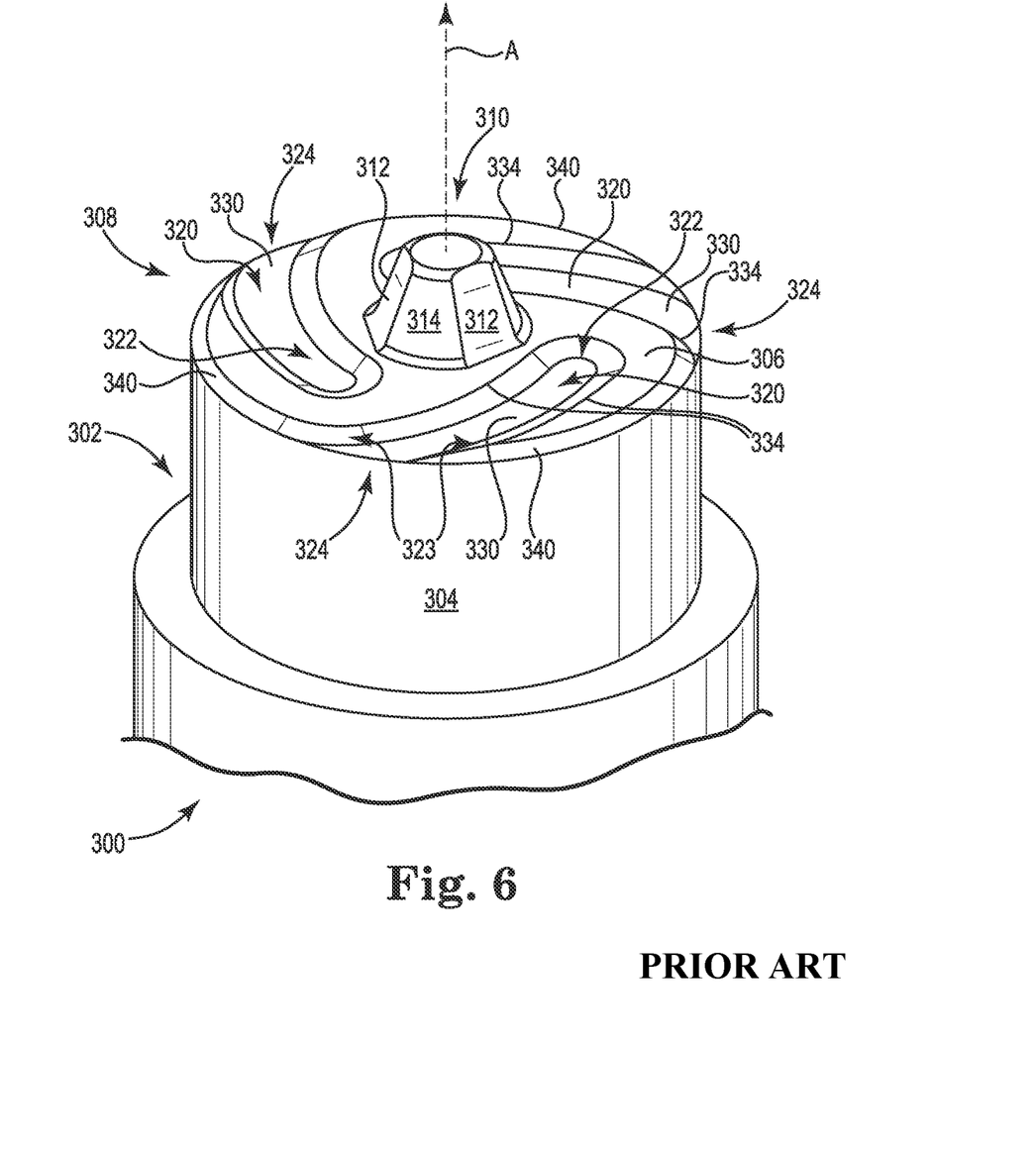
FIG. 6 shows an example of a friction stir weld tool.

An example of a useful tool is shown at FIG. 6. As illustrated, tool 300 includes support body 302 that has a longitudinal axis (A), outer surface 304 centered on the axis, and distal face 306 centered on the axis and extending from the axis laterally to perimeter 308 of distal face 306 and support body 302. Pin 310 extends from distal face 306 in a direction along the axis and distally from distal face 306.

Distal face 306, exemplary as illustrated, includes a scroll pattern that includes at least two arcuate (when viewed in a direction of axis A) grooves 320 formed in distal face 306. Each groove 320 extends from a groove start location 322 located between the axis and perimeter 308, to a groove end segment 324 at perimeter 308. A depth of each groove in distal face 306 may be shaped as desired, with useful or preferred grooves having a maximum depth in a range from 0.05 to 0.5 millimeters relative to the surface of distal face 306. Preferred grooves can have a shape (when viewed in cross section in a plane that includes the axis) that includes a bottom 330 (at a maximum depth of the groove) and sidewalls 323 that extend from bottom 330 to opposed distal (e.g., upper) edges 334 of each groove 320, where each groove 320 meets distal face 306 at a cornered edge. The shape of preferred grooves can include sidewalls 322 that are curved or angled (e.g., chamfered) relative to the direction of axis A, i.e., not parallel to axis A. In cross section, a useful or preferred sidewall can have a surface that is considered to extend along a line that is non-parallel to the axis, for example along a line that forms an angle with the axis that is in a range from 30 to 60 degrees. Curved or chamfered sidewalls 332 differ from sidewalls that are vertical, meaning sidewalls that extend in a direction that is parallel to axis A.

As illustrated, tool 300 includes three chamfered shoulder segments 340 that extend along perimeter 308 between three groove end segments 324. Each chamfered shoulder segment 340 extends along perimeter 308 between two adjacent groove end segments 324. Each chamfered shoulder segment 340 includes a surface that connects and extends between distal face 306 and a distal end of outer surface 304 of support body 302, with each surface extending in a direction that includes a directional component that is the parallel with the axis. In cross section in a plane of the axis, each chamfered shoulder segment surface can be considered to extend along a line that is non-parallel to the axis, for example along a line that forms an angle with the axis that is in a range from 30 to 60 degrees.

Pin 310 can have any structure, shape, or form that will provide desired performance of tool 300 when used for friction stir welding. Useful and preferred examples of shapes of pin 310 can include multiple outer surfaces (e.g., sidewalls) that include three or more facets 312, which are flat or planar surfaces that can preferably be oriented to be non-parallel to axis A. Facets 312 may be connected to adjacent facets or may optionally be interrupted by rounded portions 314. The number of facets on a pin can be as desired and useful, e.g., at least 3, and up to 5, 6, 8, or more. Distal pin end (the portion of pin 310 that is farthest away from distal face 306) of pin 310 can be flat and planar, i.e., perpendicular relative to axis A or may be cornered, angular, or substantially sharp, e.g., if formed by an intersection of facets 312.

Specific dimensions of a tool as described can be any that are useful for forming a friction stir weld. Useful sizes of a support body (e.g., diameter at a distal face), grooves, and a pin of a tool can be comparable to tools that have previously been useful for forming friction stir welds. According to certain embodiments of tools of the present description, however, a tool may have relatively smaller features sizes, which may allow a tool to be useful to form friction stir welds with potentially advantageous operating parameters, for example by use of a relatively higher tool rotational speed (rpm), relatively higher translational speed, a reduced downforce, or two or more of these.

In additional detail, useful dimensions of a support body and pin may be ones that are capable of being used to form a desired friction stir weld, with dimensions of any particular tool being selected based on factors that include the type and dimensions (e.g., thickness) of a workpiece, the desired size dimensions (width and depth) of a friction stir weld that is being formed, and desired or preferred operating parameters such as rotational speed (rpm), translational speed, and downforce. For a tool that is capable of preferred uses that include forming a friction stir weld from a relatively thin workpiece, or for use in a friction stir welding process that includes one or more of a relatively high rotational speed (rpm), relatively high translational speed, or relatively low downforce, certain relatively smaller dimensions can be preferred, such as a relatively small diameter of the support body, a relatively short length of a pin, and a relatively small diameter of the pin. According to such embodiments, a diameter of a support body at or near a shoulder may be less than about 10 millimeters, e.g., in a range from 1 to 8 millimeters, such as from 2 to 5 or 3 to 4 millimeters. Also according to these embodiments, a length of the pin may be a length that is sufficient to form a weld of a desired depth; when working with a relatively thin workpiece, a length of an example pin may be in a range from 0.2 to 1.5 millimeters, e.g., from 0.2 to 0.6 or 0.8 millimeters. A diameter of the pin for such embodiments, measured at a base of the pin located at a connection of the pin to the distal face, may be in a range from 0.5 to 1.5 millimeters.

The invention claimed is:

1. An enclosure comprising:
    a metal base comprising:
        a horizontal bottom and a base cavity defined by a bottom and vertical base sidewalls at a base perimeter,
        an outer sidewall surface extending along the base perimeter that includes:
            a shoulder comprising:
                a horizontal shoulder surface,
                an upper sidewall surface extending vertically upward from the horizontal shoulder surface, and
                a lower sidewall surface extending vertically downward from the horizontal shoulder surface; and
            at least one recess formed within the horizontal shoulder surface, the upper sidewall surface, and the lower sidewall surface, extending along a portion of the outer sidewall surface;
    a metal cover located over the base.

2. The enclosure of claim 1 wherein the cover comprises a horizontal top portion extending over the base and a lip at a cover perimeter, the lip extending in a vertical direction relative to the horizontal top portion, the lip including a lower lip portion that forms a joint with the shoulder when the cover is installed over the base.

3. The enclosure of claim 1 wherein at least the one recess has a depth equal in a range from 0.1 to 2 millimeters.

4. The enclosure of claim 1 wherein at least the one recess has a length along the base perimeter in a range from 4 to 30 millimeters.

5. The enclosure of claim 1 wherein at least the one recess extends below the horizontal shoulder surface by a distance in a range from 1 to 20 millimeters, and the recess extends above the horizontal shoulder surface by a distance in a range from 1 to 20 millimeters.

6. The enclosure of claim 1 wherein the lower lip portion has a thickness in a range from 10 to 50 mils.

7. The enclosure of claim 1 comprising a friction stir weld formed at a joint around the base perimeter.

8. The enclosure of claim 1 comprising a low density interior atmosphere.

9. The enclosure of claim 8 wherein the enclosure is part of a hard disk drive.

* * * * *